US006399849B1

(12) United States Patent
Kalb et al.

(10) Patent No.: US 6,399,849 B1
(45) Date of Patent: Jun. 4, 2002

(54) TREATMENT OF MERCURY CONTAINING WASTE

(75) Inventors: Paul D. Kalb, Wading River, NY (US); Dan Melamed, Gaithersburg, MD (US); Bhavesh R Patel, Elmhurst; Mark Fuhrmann, Babylon, both of NY (US)

(73) Assignee: Brookhaven Science Associates LLC, Upton, NY (US)

(*) Notice: Subject to any disclaimer, the term of this patent is extended or adjusted under 35 U.S.C. 154(b) by 0 days.

(21) Appl. No.: 09/280,883

(22) Filed: Mar. 29, 1999

(51) Int. Cl.[7] ................................................. G21F 9/16
(52) U.S. Cl. ............................... 588/15; 588/3; 588/252; 588/256
(58) Field of Search ............................... 588/2, 3, 4, 15, 588/18, 252, 256

(56) References Cited

U.S. PATENT DOCUMENTS

| 4,302,255 A | * 11/1981 | Kidwell, Jr. et al. ........ 106/275 |
| 4,354,942 A | 10/1982 | Kaczur et al. ............... 210/712 |
| 4,387,167 A | * 6/1983 | Kidwell, Jr. et al. ........ 501/140 |
| 4,428,700 A | * 1/1984 | Lennemann ................ 405/128 |
| 4,844,815 A | 7/1989 | Ader et al. .................. 210/751 |
| 4,921,936 A | 5/1990 | Adams ........................ 528/389 |
| 5,304,709 A | 4/1994 | Babcock et al. ............ 588/257 |
| 5,347,072 A | 9/1994 | Adams ........................ 588/256 |
| 5,360,632 A | 11/1994 | Johnson et al. ............. 427/212 |
| 5,562,589 A | 10/1996 | Adams ........................ 588/256 |
| 5,569,153 A | 10/1996 | Mallow et al. .............. 588/256 |
| 5,649,323 A | 7/1997 | Kalb et al. ....................... 588/8 |
| 5,678,234 A | 10/1997 | Colombo et al. .............. 588/4 |

OTHER PUBLICATIONS

Kalb, et al., "Thermal Treatment of Radioactive, Hazardous Chemical, Mixed and Medical Wastes", 1991 Incineration Conference, Brookhaven National Laboratory, Upton, N.Y., May 1991.

Gorin et al., "Final Disposal Options for Mercury/Uranium Mixed Wastes from the Oak Ridge Reservation", Y–12 Oak Ridge Y–12 Plant, Martin Marietta, Aug. 1994.

* cited by examiner

Primary Examiner—Steven P. Griffin
Assistant Examiner—Eileen E. Nave
(74) Attorney, Agent, or Firm—Margaret C. Bogosian

(57) ABSTRACT

A process is provided for the treatment of mercury containing waste in a single reaction vessel which includes a) stabilizing the waste with sulfur polymer cement under an inert atmosphere to form a resulting mixture and b) encapsulating the resulting mixture by heating the mixture to form a molten product and casting the molten product as a monolithic final waste form. Additional sulfur polymer cement can be added in the encapsulation step if needed, and a stabilizing additive can be added in the process to improve the leaching properties of the waste form.

20 Claims, 5 Drawing Sheets

SPC and Mercury: Black Waste Form

SPC and Mercury: Black Waste Form

SPC, Mercury and Cyanex 471x: Black Waste Form

SPC, Mercury and Sodium Sulfide: Red Waste Form

Calibration plot of Hg vapor

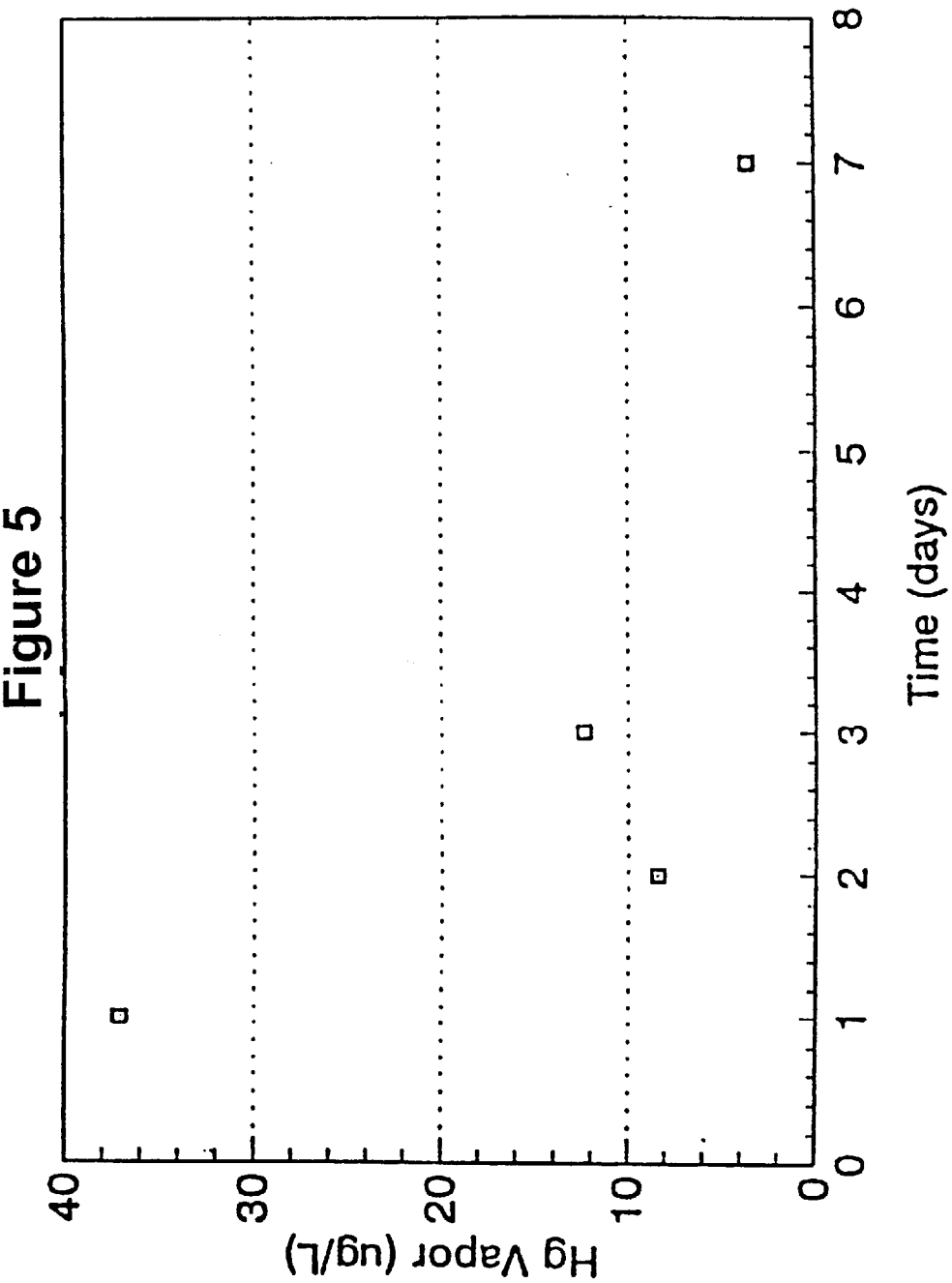

TREATMENT OF MERCURY CONTAINING WASTE

This invention was made with Government support under Contract No. DE-AC02-98CH10886, between the U.S. Department of Energy and Brookhaven Science Associates. The Government has certain rights in the invention.

BACKGROUND

The present invention relates to the treatment of mercury containing waste. More particularly, the invention relates to a process for treating mercury containing waste by stabilizing and encapsulating the waste through the use of sulfur polymer cement.

At the present time a great deal of effort is being expended for finding economic and effective methods of disposing of hazardous waste, including mercury containing waste, so that it does not leach into the soil or water supply. Such waste often contains radionuclides, making its handling and disposal even more problematic. This highly variable type of waste includes radioactively contaminated elemental mercury, as well as bulk materials or debris that contain dispersed mercury.

Large amounts of such mercury containing waste has been generated by both military and civilian uses. Much of this waste is "mixed waste", i.e., it also contains radionuclides. The Department of Energy has estimated that it has greater than 38,000 $m^3$ of mixed low-level and transuranic mercury containing waste throughout various facilities in the U.S. Approximately 6 $m^3$ of liquid elemental mercury are currently being stored and additional inventories are expected to be generated.

Congress has enacted the Resource Conservation and Recovery Act (RCRA) mandating cleanup and disposal of hazardous materials, including toxic metals such as mercury. With respect to mercury containing waste, the Environmental Protection Agency (EPA) requires that the mercury be combined with reagents such as copper, gold, or sulfur that result in a solid, non-volatile product. RCRA requires that the waste form pass the Toxicity Characteristic Leaching Procedure (TCLP) in order for the mercury containing waste treated according to EPA regulations to be disposed of properly.

Waste containing dispersed mercury is sometimes treated by separation methods, such as retorting and/or extraction. The separation processes will remove the mercury from the bulk waste. However, a secondary waste stream of concentrated mercury is generated, which then must be disposed of. Also, retorting (heating with recovery of mercury for reuse) is not appropriate for radioactive waste.

Other methods of treating such waste involve encapsulation. In such methods, an effort is made to seal the mercury waste from the surrounding environment. For example, in U.S. Pat. No. 5,569,153 a method is disclosed in which pozzolana, a calcium hydroxide containing material, hydrothermal cement reactant, hydraulic cement, and toxic waste are mixed with additional liquid to form a moldable mixture, which is then cured. The cured form is then embedded into a sulfur cement. While encapsulation methods have reduced the leachability of the mercury in the waste, they have not been proven to be a solution to long-term storage or disposal.

Attempts have also been made to react mercury within the waste directly with inorganic sulfur compounds to form mercury sulfide, which is an insoluble compound. However such processes have proven impractical due to dangerous gases or dust formed during such processes. For example, U.S. Pat. No. 4,354,942 discloses a method for stabilizing mercury-containing materials by directly adding selected inorganic sulfur compounds to prevent the leaching of soluble mercury therefrom. However, the use of inorganic sulfur compounds alone, often results in inadvertent mixing of acids with the sulfides, thereby releasing toxic hydrogen sulfide gas. Also, the use of inorganic sulfur compounds to directly react with mercury can be prohibitively expensive. For example, sodium sulfide presently costs about $2.50/lb whereas sulfur polymer cement, the main ingredient in the process of the invention, presently costs approximately $0.12/lb. Thus, if inorganic sulfur compounds are going to be used, it is much more cost effective to utilize them as an additive.

The direct reaction of elemental mercury and elemental sulfur to form HgS has also been studied. See Gorin, A. H. et al. "Final Disposal Options for Mercury/Uranium Mixed Wastes From The Oak Ridge Reservation," Y/DZ-1106, August 1994. This method is shown to have better leaching properties and lower vapor pressures compared with other reagents. This treatment produces a chemically stable dry powder, but does not provide any additional barrier to leaching. Further, the resulting dry powder is susceptible to mechanical dispersion, which is particularly troublesome when the waste mix is radioactive.

Gorin et al. also disclose the possibility of reacting the mercury with a modified sulfur cement, also known as sulfur polymer cement (SPC). However, they conclude that this method is inferior to the direct reaction of elemental sulfur because of the engineering difficulties, the excessive process temperature required, and unacceptable leaching characteristics of the resulting samples.

Thus, there remains a need for methods of stabilizing and solidifying mercury containing waste so that it can be stored or disposed of without presenting a pollution problem.

SUMMARY OF THE INVENTION

The present invention provides a process for the treatment of mercury containing waste in a single reaction vessel. The process is effective in treating various types of mercury contaminated waste; such as elemental mercury or mercury compounds, mercury contaminated bulk material, or mercury contaminated debris. The process is also effective for the treatment of mercury containing waste that also contains radionuclides, i.e. mixed wastes.

The first step of the process (step (a)) is the stabilization of the mercury containing waste. This stabilization step includes combining mercury containing waste with sulfur polymer cement under an inert atmosphere to form a resulting mixture. Argon or nitrogen are preferred. The second step of the process (step (b)) is the encapsulation of the waste. In the encapsulation step, the resulting mixture of step (a) is heated to form a molten product, which is then cast as a monolithic final waste form.

The preferred weight ratio of SPC to mercury containing waste in step (a) is typically between about 0.2 to about 3.0, preferably about 1.0. The initial combining of mercury containing waste with the sulfur polymer cement can occur at a preferred temperature range of from about 20° C. to about 80° C. To facilitate the reaction, it is preferred that the sulfur polymer cement be reduced to a particle size of less than about 3000 microns, before being added as a reagent.

In a preferred embodiment, a stabilizing additive is further added to the mercury containing waste and the sulfur polymer cement. The stabilizing additives can be sodium sulfide, triisobutyl phosphine sulfide, calcium hydroxide, sodium hydroxide, calcium oxide, and magnesium oxide, or a combination thereof. Sodium sulfide or triisobutyl phosphine sulfide or a combination thereof are preferred. Sodium sulfide is most preferred. It is preferred that the stabilizing additive also be of a particle size less than about 3000 microns, when added as a reagent. The amount of stabilizing additive is usually between 0.5 and 20 wt % of the molten product, preferably between about 1–12 wt %, and most preferably between 2–5 wt %. When sodium sulfide is added as the stabilizing additive, the most preferred range is from about 2.0 wt % to about 3.0 wt % of the final waste form.

In the encapsulation step, the resulting mixture of step (a) is heated to a temperature of usually between approximately 120° C.–150° C. to form a molten product. If necessary, additional SPC can be added to the resulting mixture of step (a) to improve the viscosity of the molten product to allow for more homogenous mixing. If additional SPC is added, it is added to the resulting mixture of step (a) so as to form a waste loading of usually about 5 wt % to about 90 wt % in the final waste form. If the mercury containing waste is essentially mercury contaminated bulk materials or debris and additional SPC is added, the additional SPC is usually added in an amount to form a waste loading of about 25 wt % to about 80 wt % in the final waste form, preferably about 50 wt % to about 70 wt %. If the mercury containing waste is essentially elemental mercury or mercury compounds and additional SPC is added, the additional SPC is usually added in an amount to form a waste loading of about 10 wt % to about 50 wt % in the final waste form, preferably about 30 wt % to about 35 wt %.

The invention also includes a waste form comprising mercury containing waste stabilized and encapsulated by the addition of sulfur polymer cement and a stabilizing additive.

The process of the invention for treating mercury containing waste, therefore, produces a waste form which can more safely be disposed of, for example, in a landfill or licensed disposal facility. The process reduces mercury solubility in the waste form to enable compliance with EPA TCLP criteria, lowers mercury vapor pressure during processing and in the final product, eliminates dispersibility of the stabilized product, and reduces leachability of radioactive constituents within the waste.

For a better understanding of the present invention, together with other and further objects, reference is made to the following description, taken in conjunction with the accompanying drawings and its scope will be pointed out in the appended claims.

BRIEF DESCRIPTION OF THE DRAWINGS

FIG. 5 shows the concentration of Hg vapor as a function of time.

DETAILED DESCRIPTION OF THE INVENTION

Figure 1:
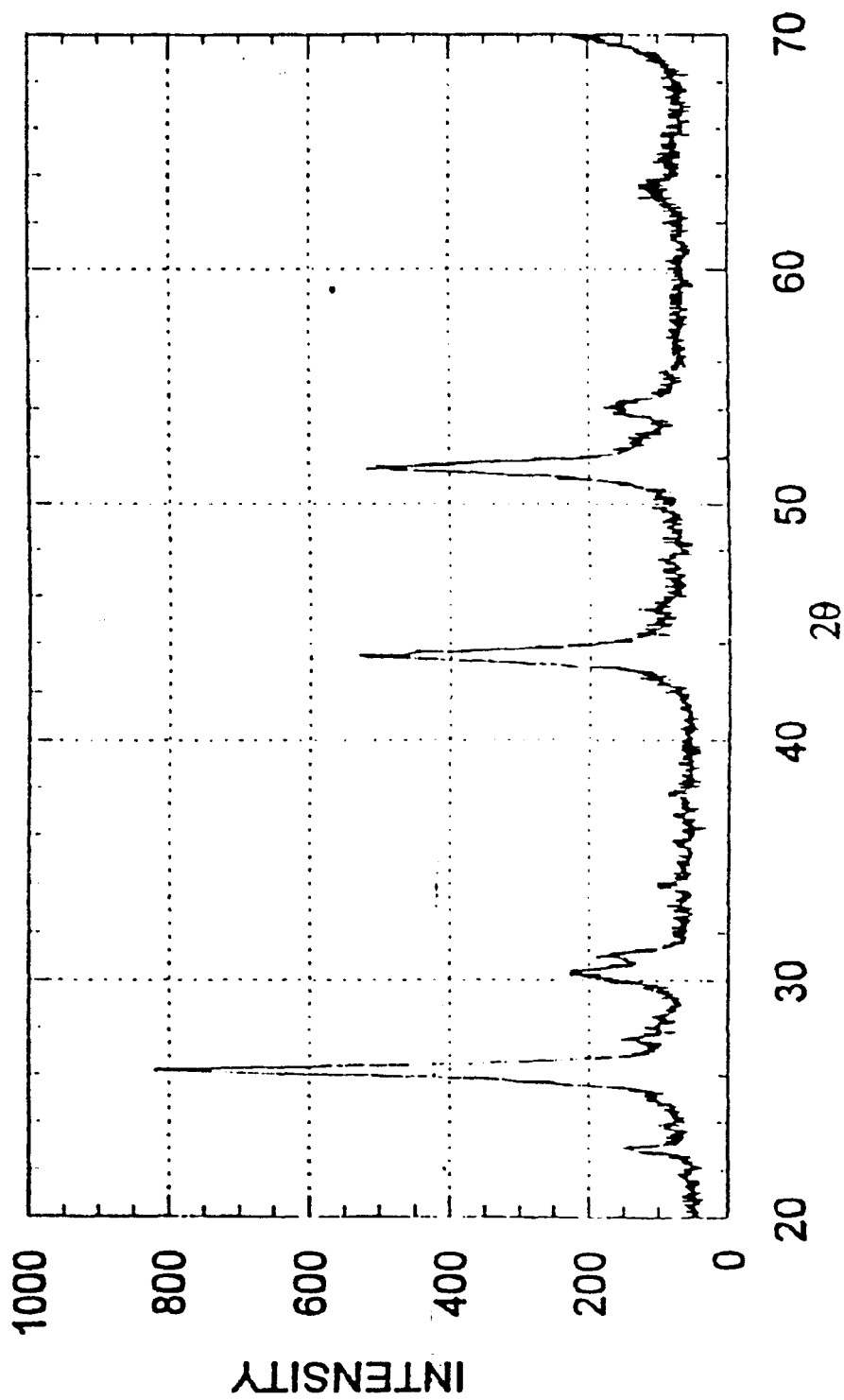
FIG. 1 shows the powder diffraction pattern of a black waste form from SPC and mercury.

In accordance with the present invention, a process is provided for the treatment of mercury containing waste in a single reaction vessel. More specifically, the mercury containing waste is treated by stabilization and encapsulation of the mercury containing waste through the use of sulfur polymer cement.

The process of the invention is a two step process. The first step (step (a)) is the chemical stabilization of the mercury containing waste by combining the waste with sulfur polymer cement (SPC) under an inert atmosphere to form a resulting mixture. The second step (step (b)) is an encapsulation step in which the resulting chemically stabilized mixture from the first step is heated to form a molten product, which molten product is then cast as a monolithic final waste form. The resulting final waste form complies with EPA leaching standards.

The mercury containing waste treated by the process of the invention can be any waste that is contaminated with mercury. This includes waste that is essentially mercury, that is elemental mercury or other mercury compounds; mercury contaminated bulk materials, such as sand or soil; or mercury contaminated debris, that is, material that is not particulate or is larger than particles of sand or soil (e.g. glass, stones, gravel, etc.). When processing using a screw or blade-type mixer, items of debris should be removed before the waste is processed. Debris can be removed from the rest of the waste using a sieve with a screen. A screen size up to ⅜ inch is preferred for this method.

The larger debris which has been removed from the initial batch of waste can be processed in the same manner as mercury contaminated bulk materials, as described below. While mercury containing waste which is essentially elemental mercury or mercury contaminated bulk materials can be mixed using an automated mixer, larger debris should be mixed by other means. For example, the SPC and mercury contaminated debris can be mixed manually or by agitation, such as with a paint shaker.

The mercury containing waste can also include what is known in the art as mercury mixed waste, or waste that contains low level radioactive material as defined by Nuclear Regulatory Commission Regulations set forth in 10 C.F.R 61. Low level radioactive wastes do not include spent nuclear fuel, transuranic waste, or byproduct materials which are defined as high-level radioactive wastes in §11e (2) of the Atomic Energy Act of 1954 at 43 U.S.C. 2014(e).

Environmental Protection Agency (EPA) regulations, i.e. 40 CFR 268.40, stipulate that elemental mercury be "amalgamated" before disposal. As defined, this "amalgamation" requires that the mercury be combined with reagents such as copper, gold, or sulfur that result in a solid, non-volatile product. It should be noted that, according to EPA regulation 40 CFR 268.40, all processes where mercury is mixed with metals and sulfur are called amalgamation. However, combining mercury with sulfur results in mercuric sulfide (HgS), which is a new compound, not an amalgam or alloy.

Mercuric sulfide is the most stable compound formed between mercury and sulfur. It exists in two stable forms. One is the black cubic tetrahedral form, which is most commonly obtained when soluble mercuric salts and sulfides are mixed. The other stable form is the red hexagonal form found in nature as cinnabar. Both forms of mercuric sulfide are insoluble in water ($K_{sp.}$ red=$3.0 \times 10^{-53}$ $M^2$ and $K_{sp.}$ black=$1.9 \times 10^{-15}$ $M^2$) and in acidic solutions.

The process of the invention is designed to treat mercury containing waste by stabilizing the mercury and encapsulating the stabilized mixture. Stabilizing means reacting the mercury within the mercury containing waste with sulfur polymer cement to form mercuric sulfide. In this way, the mercury containing waste is stabilized to form an insoluble, inert, material.

In the second step, the resulting stabilized mixture is encapsulated, meaning the stabilized waste is embedded within the sulfur polymer cement, thereby improving the characteristics of the final waste form. When the mercury containing waste is essentially mercury or mercury contaminated bulk materials, such as sand or soil, the stabilized particles of mercury or bulk material is encapsulated. This can be referred to as microencapsulation. If the waste contains mercury contaminated debris, the stabilized waste is macroencapsulated, meaning the larger item of debris is embedded within the sulfur polymer cement.

Casting refers to forming the molten homogenous mixture of the present invention into a desired waste form for disposal, and then cooling the molten product into a final waste form. Casting is part of the encapsulation process. Casting may or may not involve the use of a collection container separate from the reaction vessel. Preferably, the cooling is performed in a vessel suitable for disposal by permitting the temperature to be reduced to below its melting point in a manner which prevents cracking or shrinking.

The amount of leachable mercury is determined by EPA Toxicity Characteristic Leaching Procedure (TCLP) as set forth in Federal Register, Vol. 51, No. 114, Part 261.24, p.21685 (Jun. 13, 1986). For disposal in a landfill, a waste form currently must reach less than 0.2 mg/l of soluble mercury when subjected to a TCLP assay. EPA is phasing in more stringent requirements known as Universal Treatment Standards (UTS) in which the maximum TCLP concentration is 0.025 mg/l. The process of the invention produces a waste form with such leachability characteristics.

Both steps of the invention can be conducted in a single vessel. This is particularly beneficial when handling radioactive mercury containing waste so as to minimize exposure. Also, the single vessel helps to avoid exposure to the reagents and any intermediates formed therefrom.

The vessel may be any conventional container suitable to withstand the reaction temperatures, (e.g. a paint can, steel drum, etc.) fitted with appropriate known mechanisms for heating and mixing, or a known system for mixing at elevated temperatures (e.g. cone mixer, planetary mixer, porcupine mixer, pug mill, etc.). Because the process of the invention can produce mercury or sulfur vapors, it is preferred that the reaction be performed with an off-gas collection system. Any known system, such as a conventional negative pressure system, can be used.

Sulfur polymer cement (SPC), also known as modified sulfur cement, is usually formed by reacting sulfur as is known with about 5–10% by weight of a hydrocarbon, such as dicyclopentadiene, to form a sulfur reaction product which is more amorphous in nature as opposed to being crystalline. The method of making such modified sulfur reaction products is known and shown for example in U.S. Pat. No. 4,290,816 and the reissue thereof, U.S. Pat. No. RE 31,575.

The SPC utilized in the process of the invention is manufactured by Martin Resources, Inc., Odessa, Tex. and is marketed under the tradename CHEMENT 2000. Martin Resources uses a formulation of elemental sulfur mixed with 5 wt % of a modifier consisting of unsaturated hydrocarbon dicyclopentadiene and the monomeric form, cyclopentadiene, in a ratio of 1.0.

SPC usually comes in flat, plate-like chips that are approximately 2 in. by 2 in. by ¼ in. These chips need to be physically reduced to a particulate or powder form before being added to the mercury containing waste in the chemical stabilization step. It is preferred that the SPC be reduced to a particle size of less than 3000 microns, preferably between 10 and 250 microns. The lower particle size allows the stabilizing reaction in the first step of the process to proceed to completion more quickly. However, an SPC particle size of less than 10 microns can become difficult to physically work with and increases the flammability potential. The reduction in particle size can be performed by any known methods. For example, a ball mill containing quartz cobbles can be used for smaller samples. For large scale use, a commercial grinder can be used, e.g. Buffalo Steel Mill Company (Buffalo, N.Y.).

Prior to mixing the SPC and mercury containing waste, the reaction vessel is placed under an inert atmosphere such as argon or nitrogen. This inert atmosphere serves two purposes. First, it reduces potential flammability, thus making the process safer. Second, the inert atmosphere prevents the mercury containing waste from reacting with oxygen in the air to form mercuric oxide. Mercuric oxide is a water soluble and highly leachable compound.

In the first step of the process of the invention, mercury containing waste and SPC are mixed in the reaction vessel. In general, a sufficient amount of SPC is added to the mercury containing waste to create a sufficient molar excess of sulfur to elemental mercury to drive the stabilization reaction in the first step of the process to completion, i.e. for the mercury within the waste to react with the sulfur to form the insoluble mercuric sulfide. The preferred weight ratio of SPC to mercury containing waste is typically between about 0.2 to about 3.0. If the mercury containing waste is essentially mercury, approximate equal amounts by weight of mercury containing waste and SPC are preferred. This approximate 1:1 weight ratio of SPC to mercury assures a nearly six-fold molar excess of sulfur to mercury. This remains true if the waste contains radionuclides. This molar excess facilitates a faster reaction of the mercury metal with sulfur. Although the 1:1 ratio works well, other ratios are contemplated in order to optimize reaction times, material costs, and the performance of the final waste form.

If the mercury containing waste is essentially mercury contaminated bulk materials or debris, it is still a requirement that enough SPC be added to the waste in step (a) so that the mercury within the waste completely reacts with the sulfur in the SPC, thereby converting the mercury to its insoluble form, mercuric sulfide. Soils and debris that contain extremely high concentrations of mercury will still contain far less concentrations than the elemental mercury waste processed by the invention. Thus, in such cases, physical processing parameters, e.g. the viscosity of the mix, will determine the amount of SPC to be added to the mercury containing waste, rather than the amount of SPC required to completely react the mercury in the waste with the sulfur in the SPC. Those skilled in the art can, therefore, determine the amount of SPC required to process mercury containing waste containing such bulk materials or debris.

For example, applicants processed radioactive mercury containing waste composed mainly of sand and silt with a small percentage of gravel and approximately 5% debris, e.g. glass, metal and plastic. The waste contained significant mercury concentrations, e.g. 18,000 mg/kg. The larger debris was removed and the waste was sieved using a ⅜ inch screen to remove stones and gravel. Using such waste, applicants processed mixtures up to 70 wt % soil. However, when discharging the waste material, a layer of material tended to stick to the wall of the vessel and required manual scraping. When the waste loading was reduced to 60 wt % soil, the viscosity of the mixture was lower, and most of the mixture flowed easily out of the reaction vessel and into the collection container.

While the mercury containing waste is being mixed in the reaction vessel under an inert atmosphere, the mercury in the waste reacts with the sulfur in the SPC to form the insoluble compound mercuric sulfide.

$$Hg + S \rightarrow HgS \tag{1}$$

Because the process includes this chemical stabilization of the mercury to an insoluble form, it meets EPA requirement for amalgamation.

The mixing of the SPC and mercury containing waste can be performed manually or by any known commercial mixers. For example, the mixer can be an agitator, such as a paint shaker, or a system for mixing at elevated temperatures, such as a cone mixer, planetary mixer, porcupine mixer, pug mill, etc.

This reaction in the first step in the process can occur at room temperature. To accelerate the mercuric sulfide formation in the first step of the reaction, it is preferred that the reaction vessel be heated to between about 20° C. to about 80° C., preferably between about 35° C. to about 50° C. with agitation for approximately 4–8 hours, depending on the concentration of mercury being treated. Any known method of heating the reaction vessel may be used, such as heating tape, hot oil or steam bath, etc. The reaction temperature can also be determined by any known method, such as placing a thermocouple directly into the reaction vessel. If the waste contains mainly bulk materials or debris with a relatively small concentration of mercury, less time will be required to stabilize the mercury within the waste. Those skilled in the art will be able to determine the time necessary to complete the reaction.

Mercury oxides or other soluble mercury salts can exist in the metallic mercury or can be formed while processing the mercury containing waste. These soluble compounds compromise the TCLP performance of the waste forms. In such cases, a stabilizing additive can be added as a reagent to reduce the leaching of mercury salts from the resultant waste form. The stabilizing additives can be sodium sulfide ($Na_2S$—$9H_2O$), triisobutyl phosphine sulfide, also known as Cyanex 471x, calcium hydroxide, sodium hydroxide, calcium oxide, and magnesium oxide, or a combination thereof. Sodium sulfide or triisobutyl phosphine sulfide or a combination thereof are preferred. Sodium sulfide is most preferred.

The amount of stabilizing additive added to the mixture, i.e. mercury containing waste and SPC, will usually be between 0.5 and 20 wt % of the final waste form, preferably between 1–12 wt %, and most preferably 2–5 wt % of the final waste form. It has been found that sodium sulfide works exceptionally well as a stabilizing additive when added in an amount approximately 2–3 wt % of the final waste form. To improve the reaction between the stabilizing additive and the other reagents, it is preferred that the stabilizing additive also be of a particle size less than about 3000 microns, preferably between about 10 to 250 microns.

A mild exotherm is observed when a mixture of SPC powder, mercury waste and a stabilizing additive is heated. For example, when SPC, mercury containing waste, and sodium sulfide or triisobutyl phosphine sulfide were mixed and warmed to approximately 35° C., the temperature of the reaction mixture rises to approximately 70° C. for several hours, after which the reaction is complete. This makes it possible to process an aliquot of mercury containing waste by the process of the invention in two to eight hours compared with the sixteen hour cycle required without the use of additives or elevated temperature. Thus, the addition of the stabilizing additive not only improves the leachability characteristics of the resulting waste form, but also significantly cuts down on the reaction time required for the process.

In the second step of the process (step (b)), the chemically stabilized mixture from step (a) is encapsulated by increasing the temperature of the stabilized mixture to form a molten product, and casting the molten product as a monolithic final waste form. If necessary, additional SPC can be added during the encapsulation step so that the viscosity of the molten mixture may be suitable for homogenous mixing. If additional SPC is added, it is preferred, although not necessary, that the additional SPC also be of a particle size of less than 3000 microns.

As with the chemical stabilization step, less additional SPC will be required in the encapsulation step if the mercury containing waste to be treated contains a relatively low concentration of mercury. If additional SPC is added, the additional SPC is added to the resulting mixture of step (a) so as to form a waste loading of usually about 5 wt % to about 90 wt % in the final waste form. If the mercury containing waste is essentially mercury contaminated bulk materials or debris and additional SPC is added, the additional SPC is usually added in an amount to form a waste loading of about 25 wt % to about 80 wt % in the final waste form, preferably about 50 wt % to about 70 wt %. If the mercury containing waste is essentially mercury and additional SPC is added, the additional SPC is usually added in an amount to form a waste loading of about 10 wt % to about 50 wt % in the final waste form, preferably about 30 wt % to about 35 wt %.

The increase in temperature during the encapsulation step must be above the melting point of the SPC and sufficient to convert the stabilized mixture in step (a) to a molten product. The temperature required is usually between about 120–150° C., preferably about 130–140° C. The molten product is then cast as a monolithic final waste form. The waste form can be cast in any conventional container, preferably a container suitable for disposal, e.g., steel canister.

The following examples are provided to assist in a further understanding of the invention. The particular materials and conditions employed are intended to be further illustrative of the invention and are not limiting upon the reasonable scope thereof.

EXAMPLE 1

Five (5) kilograms of elemental mercury waste and 5 kilograms of SPC were added to a single reaction vessel, thereby forming a 1:1 ratio by weight. SPC was provided by Martin Resources (Odessa, Tex.) and contained 95% elemental sulfur. The Buffalo Steel Company (Buffalo, N.Y.) was contracted to grind the SPC into a powder of a particle size less than 250 microns.

The reaction vessel was a 5-gallon heavy-gauge steel drum attached to a paint shaker (5033 Series Red Devil, Minneapolis, Minn.). Quartz stones were added to enhance mixing. Heating tape attached and surrounded the steel drum in order to heat the reaction mixtures. To monitor and control the temperature, a thermocouple was inserted into the vessel and connected to a digital PID controller. The reaction vessel was equipped with openings that allow venting gases from the heating of the sulfur polymer cement. The reaction vessel and paint shaker were located inside a walk-in fume hood, to allow any mercury or sulfur vapors to be safely dispersed.

After the materials were loaded, argon gas was used to purge any air from the reaction vessel. The reaction mixture was then heated to approximately 40° C., while mixing, for about four (4) to eight (8) hours to allow the mercury and the sulfur within the SPC to react to form mercury sulfide (HgS).

To test the progress of the stabilization reaction, an aliquot (approximately 10 grams) of the crude reaction mixture was placed in a centrifuge tube and spun between 7,500 and 10,000 rpm for one hour. Centrifugation was performed using a Sorval RC-5 centrifuge. When unreacted elemental mercury remained in the mixture, a visible layer of mercury formed on the surface of the tube. In one sample, where the amount of unreacted mercury was significant, it was separated and weighed. The isolated mercury was 0.75 grams and the remaining sample was 9.83 grams. Therefore, approximately 15% of the mercury was unreacted and isolated, i.e., the reaction was 85% completed. This simple method can be used to determine when the reaction is 99% complete. In general, as indicated above, it will take 4–8 hours for the sulfur to completely react with the mercury in the waste. Less time is required if a stabilizing additive is used.

When the reaction was complete, 5 kg of additional SPC was added to the resulting mixture from the first step, forming a waste loading of about 33 wt % in the final waste form. After the additional SPC was mixed for about four (4) hours, the temperature was raised to approximately 135° C., until the mixture melted. The resulting homogenous molten product was then cast by pouring it into paint cans and allowing it to cool to form a monolithic waste form.

EXAMPLE 2

In a separate example, a stabilizing additive was added to 5 kg of mercury mixed waste and 5 kg of SPC. In one sample, sodium sulfide nonahydrate ($Na_2S$—$9H_2O$) obtained from the Cooper Chemical Company (Long Valley, N.J.) was added in an amount of 3% by weight of the waste form. In another sample, triisobutyl phosphine sulfide (Cyanex 471x) obtained from Cytec Corporation (Niagra Falls, ON) was added in an amount of 3% by weight of the waste form. In a third sample, a combination of $Na_2S9H_2O$ and Cyanex 471x were added each in an amount of 1.5% by weight of the waste form.

After the reagents were added, they were mixed and warmed to a temperature of approximately 35° C. Due to the exotherm of the reaction, the temperature would rise to approximately 70° C. for several hours, after which the first step of the process was complete.

Five (5) kg of additional SPC was then added to the resulting mixture to again form a waste loading of approximately 33 wt % in the final waste form. After the additional SPC was mixed for about four (4) hours, the temperature was raised to approximately 135° C., until the mixture melted. The resulting homogenous molten product was then cast by pouring it into paint cans and allowing it to cool to form a monolithic final waste form.

EXAMPLE 3

TCLP assays were then obtained on the samples to test the leachability of the resulting monolithic waste form. A TCLP assay was also obtained on unprocessed mercury as a baseline.

The TCLP assay was obtained for the unprocessed mercury using a Liberty 100 Inductively Coupled Plasma (ICP) Spectrometer. The method of using this equipment is well known in the art. However, its sensitivity is somewhat limited to approximately 100 ppb. Therefore, the TCLP assays were obtained on the remaining samples using cold vapor analyses (EPA method 7470) which is also well known in the art. The cold vapor analyses were performed using a Perkin Elmer Model 4000 Atomic Absorption Spectrometer with a Perkin Elmer Model MHS-10 Mercury/Hydride system. TCLP specimens were fabricated as pellets in Teflon® molds, capable of passing through a 9.5 mm sieve.

The results of the TCLP assays are shown in Table 1.

TABLE 1

| Assay Number | Material | TCLP Results, [Hg] |
|---|---|---|
| I | Hg + SPC | Overrange (>0.4 mg/l) [FAIL] |
| II | Hg + SPC | 0.02 mg/l [PASS] |
| III | Hg + SPC + Cyanex 471x (3%) | 0.42 mg/l [FAIL] |
| IV | Hg + SPC + $Na_2S9H_2O$ (3%) | 0.026 mg/l [PASS] |
| V | Hg + SPC + $Na_2S9H_2O$ (1.5%) + Cyanex 471x (1.5%) | 0.064 mg/l [PASS] |
| VI | Untreated Elemental Hg | 2.64 mg/l |

The results demonstrate that the samples with sodium sulfide as an additive consistently result in acceptable levels of mercury in TCLP leachates. Assay IV containing sodium sulfide as the sole additive and Assay V containing equal parts of sodium sulfide and Cyanex 471x as additives, yielded very favorable TCLP results of 0.02 and 0.026 mg/l, respectively. Assay II demonstrates the process as being effective without any stabilizing additive with a TCLP result of 0.02 mg/l. In the cases where the samples did not meet TCLP leaching requirements, the reaction to HgS was not complete, most likely due to inadequate processing time.

EXAMPLE 4

Long term leachability was evaluated for Assay IV according to the Accelerated Leach Test. See, ASTM, "Accelerated Leach Test for Diffusive Releases from Solidified Waste and a Computer Program to Model Diffusive, Fractional Leaching from Cylindrical Waste Forms," ASTM C-1308-95, American Society of Testing Materials, West Conshocken, Pa., 1995.

This method is a dynamic test in which the distilled water leachant is replaced on a periodic basis. Data is evaluated using a related computer program that calculates incremental and cumulative contaminant fractions released, identifies predominant leaching mechanisms and effective diffusion coefficient, and enables prediction of long-term releases if diffusion is the controlling mechanism. Leach results closely match those predicted by the diffusion model, indicating that diffusion is the predominant leaching mechanism. Following eleven days of leaching, a total of only $5.8 \times 10^{-4}$ percent of the mercury leached from the waste form. The effective diffusion coefficient was measured to be $4.15 \times 10^{-18}$.

EXAMPLE 5

The effect of the additives was further investigated using X-ray powder diffraction.

When no stabilizing additive is added to the mercury waste and the SPC., or when Cyanex 471x is used as the stabilizing additive, the resulting waste form is lustrous black. When sodium sulfide is used as the stabilizing additive, the resulting waste form is a dull orange color.

These observations correspond with the known fact that mercuric sulfide has two stable forms. One is a cubic phase that is black. The other is an orthorhombic phase that is red. X-ray powder diffraction studies were then performed to characterize the chemical species in the waste forms.

A crushed sample of the black waste form from the process of the invention using only elemental mercury and SPC was analyzed. The powder diffraction pattern is shown in FIG. 1 and tabulated in Table 2.

TABLE 2

| Black Waste Form | | Cubic Mercuric Sulfide | | Orthorhombic Sulfur | |
|---|---|---|---|---|---|
| d-spacing | Intensity | d-spacing | Intensity | d-spacing | Intensity |
| 3.891 | 17 | | | 3.859 | 100 |
| 3.401 | 100 | 3.378 | 100 | | |
| 3.234 | 18 | | | 3.220 | 50 |
| 2.949 | 28 | 2.926 | 34 | | |
| 2.873 | 21 | | | 2.848 | 23 |
| 2.078 | 64 | 2.068 | 57 | | |
| 1.769 | 57 | 1.764 | 45 | | |

The diffraction pattern shows the black waste form to be composed of a form of mercuric. sulfide, also known as metacinnabar (See, Swanson, H. E., Fuyat, R. K., and Ugrinic, G. M., "Standard X-Ray Diffraction Patterns," Circular 539, Volume 4, pp. 17–22 (1955)), and sulfur (See, Sliva, P., Peng, Y. B., Peeler, D. K. Bunnel, L. R., Turner, P. J., Martin, P. F., and Feng, X., "Sulfur Polymer Cement as a Low Level Waste Glass Matrix Encapsulant," PNNL-10947, Pacific Northwest National Laboratory, Richland, Wash., January 1996). The diffraction pattern study, therefore, demonstrates that the process of the invention is effective in converting mercury waste into its insoluble form, mercuric sulfide.

Figure 2:
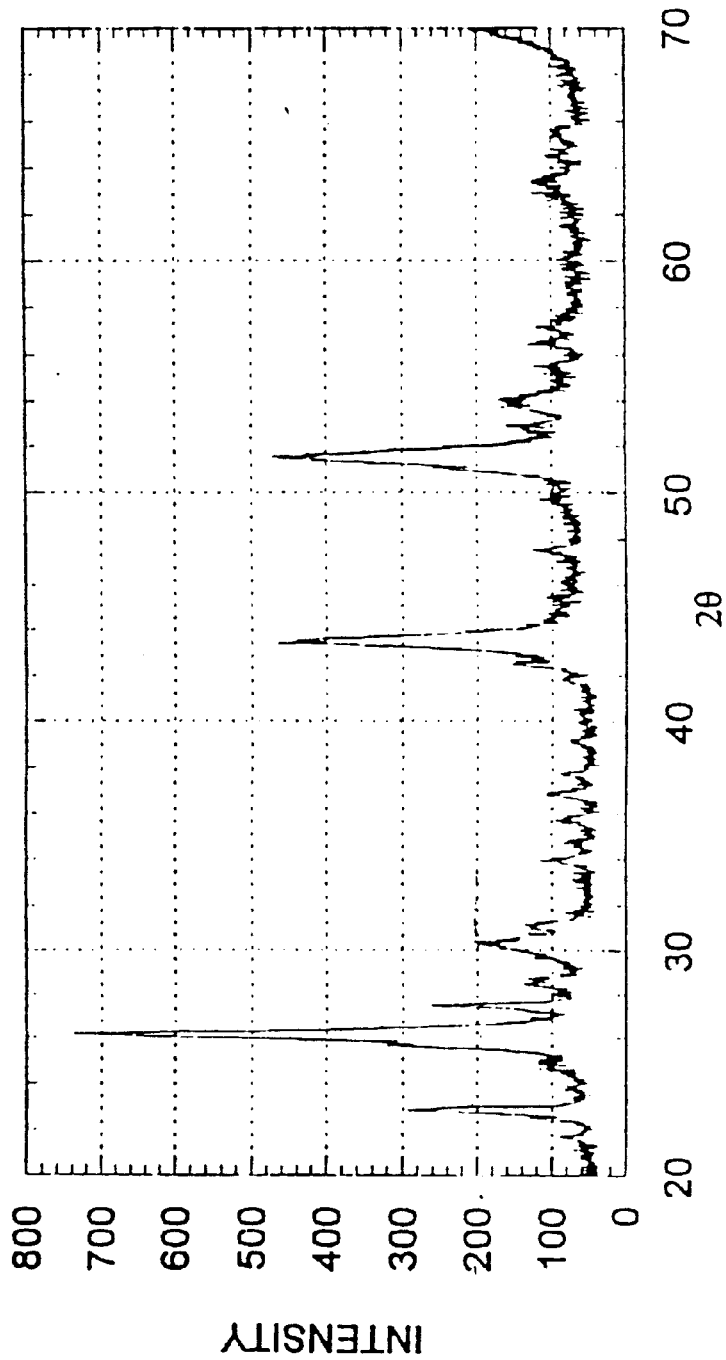
FIG. 2 shows the powder diffraction pattern of a black waste form from SPC, mercury and Cyanex 471x.

When Cyanex 471x is added to the reaction mixture of mercury and powdered SPC., the final product is a lustrous black waste form. The powder diffraction pattern from a crushed sample of that material is shown in FIG. 2. The results from the pattern in FIG. 2 are tabulated in Table 3. As in the waste prepared with no additive, the waste material is a mixture of metacinnabar and sulfur.

TABLE 3

X-Ray Diffraction Data for SPC-Hg-Cyanex 471x Waste Form, Cubic Mercuric Sulfide and Orthorhombic Sulfur

| Black Waste Form | | Cubic Mercuric Sulfide | | Orthorhombic Sulfur | |
|---|---|---|---|---|---|
| d-spacing | Intensity | d-spacing | Intensity | d-spacing | Intensity |
| 3.894 | 34 | | | 3.859 | 100 |
| 3.401 | 100 | 3.378 | 100 | | |
| 3.234 | 31 | | | 3.220 | 50 |
| 2.949 | 28 | 2.926 | 34 | | |
| 2.869 | 19 | | | 2.848 | 23 |
| 2.077 | 65 | 2.068 | 57 | | |
| 1.777 | 65 | 1.764 | 45 | | |

Figure 3:
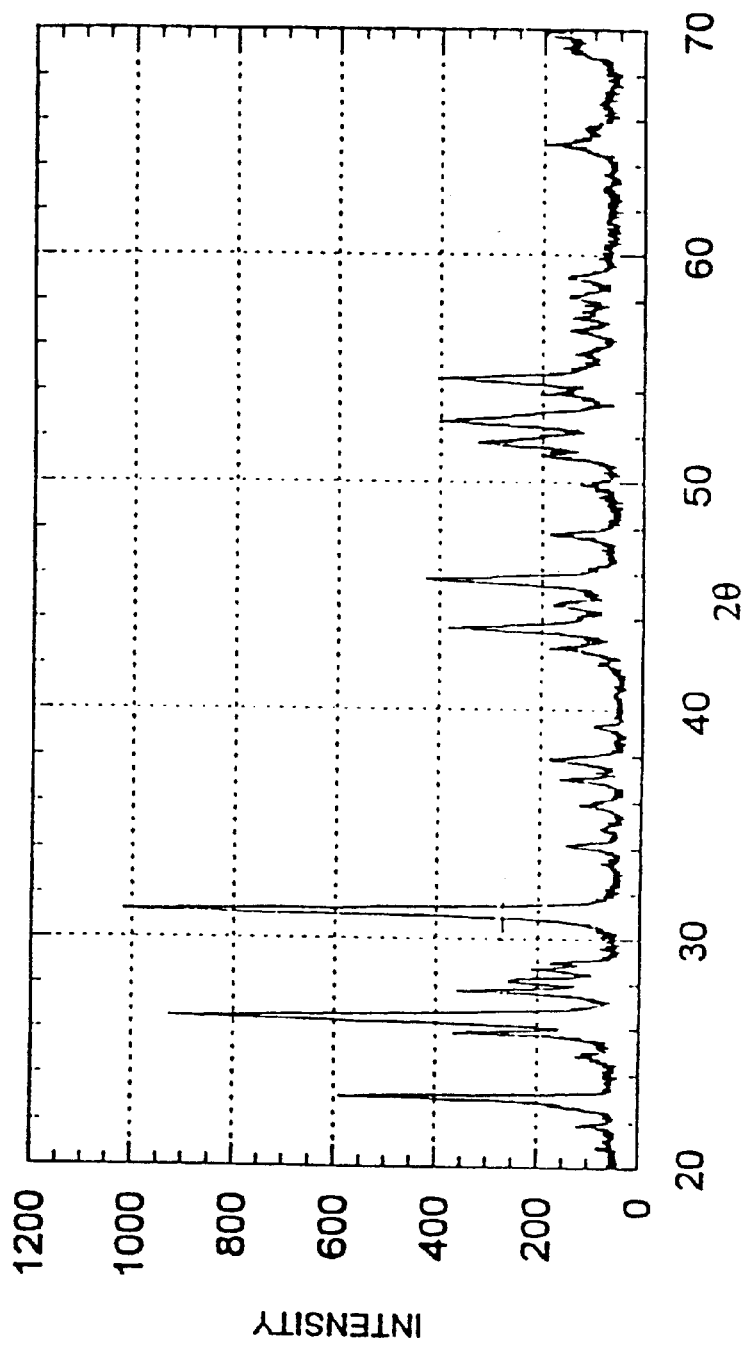
FIG. 3 shows the powder diffraction pattern of a red waste form from SPC, mercury and sodium sulfide.

When sodium sulfide is added as a stabilizing additive in the reaction mixture of mercury and SPC., a reddish brown waste form is produced. The powder diffraction pattern from that material is shown in FIG. 3. The data, tabulated in Table 4, indicate the mixture to be a mixture of hexagonal mercuric sulfide, also called cinnabar (See, Swanson, et al (1955).), and orthorhombic sulfur (See Swanson, H. E., Cook, M. I., Isaacs, T., Evans, E. H., "Standard X-ray Diffraction Powder Patterns," Circular 539, Vol. 9 (1960).

TABLE 4

X-Ray Diffraction Data for SPC-Hg-Na$_2$S Waste Form, Cubic Mercuric Sulfide and Orthorhombic Sulfur

| Red Waste Form | | Hexagonal Mercuric Sulfide | | Orthorhombic Sulfur | |
|---|---|---|---|---|---|
| d-spacing | Intensity | d-spacing | Intensity | d-spacing | Intensity |
| 3.844 | 56 | | | 3.859 | 100 |
| 3.360 | 100 | 3.359 | 100 | | |
| 3.213 | 33 | | | 3.220 | 50 |
| 2.857 | 87 | 2.863 | 94 | 2.848 | 23 |
| 2.074 | 41 | 2.074 | 26 | | |
| 1.976 | 31 | 2.068 | 57 | | |
| 1.765 | 35 | 1.764 | 45 | | |

EXAMPLE 6

A sample of stabilized mercuric sulfide was also examined before adding additional SPC in step (b). The diffraction pattern of a sample, taken from the reaction mixture of sodium sulfide, mercury and SPC gave a diffraction pattern that was essentially identical to that obtained from the previously examined final waste form, shown in FIG. 3. This indicates that the solidification processes do not affect the mercuric sulfide formed during the stabilization step, i.e. the first step of the process.

Thus, from the X-ray diffraction data, two isomorphs of crystalline mercuric sulfide from the reaction of elemental mercury and sulfur are observed. One isomorph of mercuric sulfide, cinnabar, has a hexagonal structure and a red color. The other form, metacinnabar, is black and has a cubic structure. The waste forms consisting of cinnabar performed better in the TCLP assays. Adding sodium sulfide results in an exotherm and forces the reaction or mercury in the waste and sulfur in the SPC to cinnabar. Adding Cyanex 471x also results in an exotherm, but the final product is metacinnabar. The results suggest that the different crystal formation of the cinnabar increases its leaching performance.

EXAMPLE 7

The volatility of the mercury containing waste was also examined during various stages of the processing. Mercury vapor is a workplace hazard with a low Threshold Limit Value (TLV) level of 0.05 mg/m$^3$.

During the first step of the process, mercury vapor was tested using a Drager tube obtained from Sargent Welch (Philadelphia, Pa.), which has a detection limit of 0.05 mg/m$^3$. During processing, a Drager tube was placed in front of the ventilating port for the reaction vessel. During the first step of the reaction, when the elemental mercury was warmed to approximately 40° C. for about four (4) hours, a Drager test tube showed 2 mg/m$^3$ mercury vapors in the atmosphere. The reaction vessel was then placed in a hood, and the entrance and venting ports were covered with glass wool to reduce the escape of mercury vapor. After the mercuric sulfide was formed, no mercury vapor was detected in the reaction vessel.

During the second step of the reaction, when additional SPC was added and the reaction vessel heated to approximately 135° C. until the mixture melted, no mercury vapor was detected, i.e. less than 0.05 mg/m$^3$.

The amount of mercury vapor generated from the final waste forms was also measured quantitatively using the following method. Small samples (approximately seven (7)

grams) of the waste form were placed in 250 ml plastic bottles. The mercury vapors were permitted to come to equilibrium at room temperature, for about eighteen (18) hours. A 5 ml sample of air from the headspace of the bottle was then taken. The headspace sample was injected into a glass bottle and sealed with a septum. An argon stream carried any mercury vapor to the absorption cell of a Perkin Elmer Model MHS-10 Mercury/Hydride system, where the vapor concentration was measured using the cold vapor apparatus of the Perkin Elmer Model 400 Atomic Absorption Spectrometer.

Figure 4:
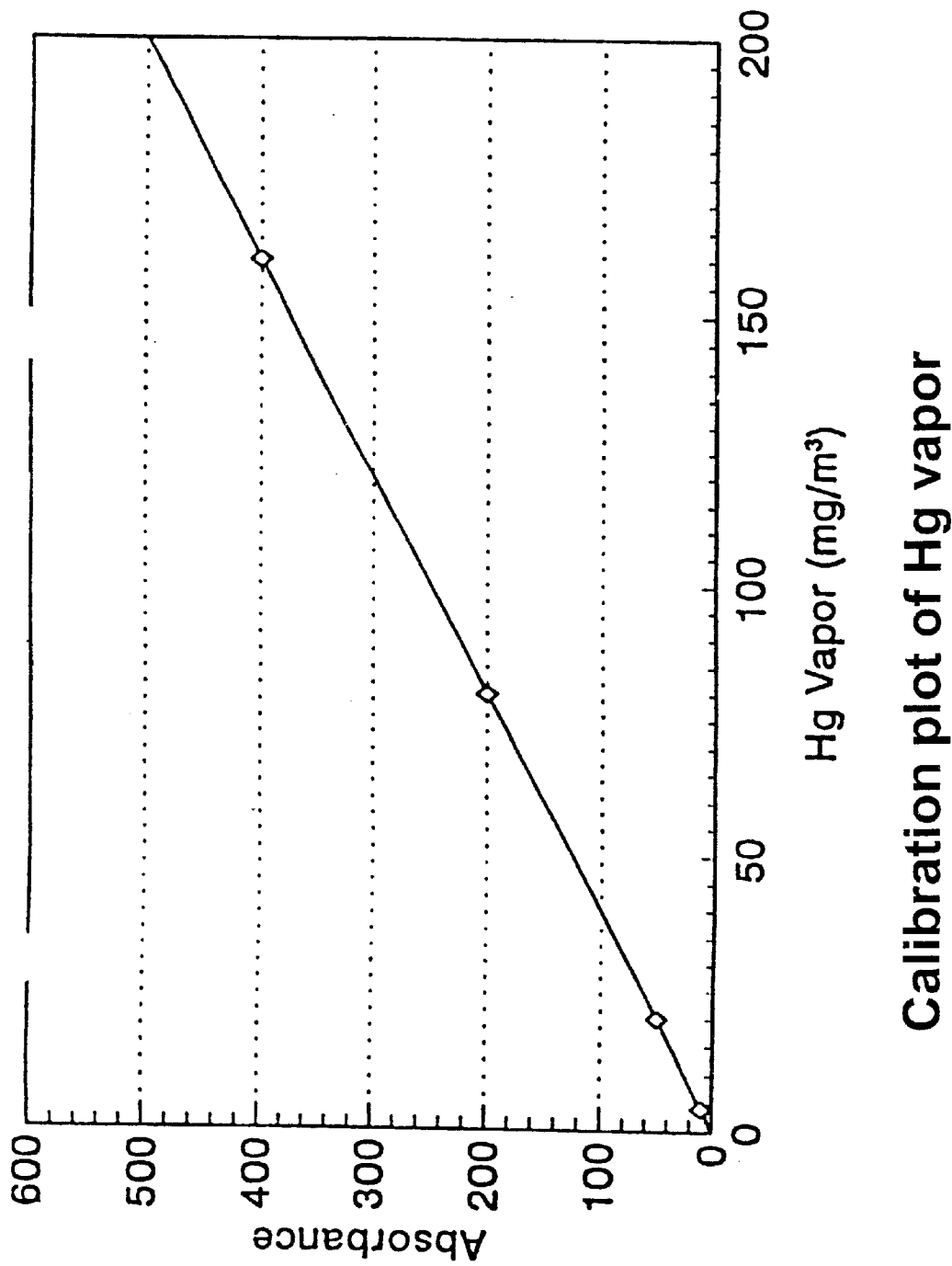
FIG. 4 shows a calibration plot of Hg vapor.

This method was calibrated using known quantities of a mercury standard using techniques identical to the mercury cold vapor method (EPA method 7470). Measured quantities of 100 ppb mercury standard solution and stannous chloride were injected into 260 cc septum topped bottles. The reaction between the two reagents quantitatively generated Hg vapor. Five ml of this vapor were withdrawn by syringe and injected into the gas mixing chamber on the cold vapor apparatus on the Atomic Absorption Spectrometer. The calibration figures produce a linear plot, shown in FIG. 4.

Equilibrium mercury vapor concentrations were characteristic of the different materials analyzed and are shown in Table 5. As shown in Table 5, the Hg vapor concentration over the elemental mercury was about 100 ug/L. The vapor concentration over the elemental mercury was measured periodically over several weeks and was reproducible. The results demonstrate that mercury waste treated by the process of the invention had much lower Hg vapor concentrations, typically at least an order of magnitude lower than elemental mercury.

Waste forms produced with sodium sulfide as a stabilizing additive on average had lower vapor concentrations than the other treated wastes. However, applicants believe that this was a function of the age of the waste material. Table 5 shows that the new waste sample from Hg, SPC, and sodium sulfide had a vapor concentration approximately 3½ times that of the sample formed one week earlier by the same reagents.

TABLE 5

Hg Vapor Concentrations in Bottles Containing Various Hg Wastes

| Sample | Absorbance | Hg Vapor ug/L |
|---|---|---|
| Elemental Hg | 243, 273 | 97, 109 |
| Hg + SPC + Cyanex 471 | 8, 14 | 3.2, 5.6 |
| Reagent HgS (red) | 3 | 1.2 |
| Hg+ SPC | 13, 16 | 5.2, 6.4 |
| Hg + SPC + Cyanex 471 for Assay III | 37, 50 | 15, 20 |
| Hg + SPC + $Na_2S$ pellets for Assay II | 5, 9 | 2.0, 3.6 |
| Hg + SPC pellets for Assay I | 82, 98 | 33, 39 |
| Hg + SPC + $Na_2S$ (New) | 21, 28 | 8.4, 11.2 |

The effect of how vapor concentration changes over time is demonstrated in FIG. 5. The concentration of Hg vapor was measured by the cold vapor method using the Atomic Absorption Spectrometer as described above. The concentration of Hg vapor sharply decreases over the span of one week from approximately 37 ug/L to approximately 3 ug/L. The decrease in Hg vapor is because of the continued reaction between the sulfide and the mercury to form HgS, with its lower vapor concentrations.

EXAMPLE 8

Mixed mercury waste containing various radionuclides, shown in Table 6 was treated by the process of the invention.

TABLE 6

Radionuclide Contaminated Mixed Mercury Waste

| Radionuclide Contaminant | Activity | Amount of Mercury Metal |
|---|---|---|
| Germanium $^{68}Ge$ | 1 $\mu$Ci | 2.2 kg |
| Carbon $^{14}C$ | 25 $\mu$Ci | less than 0.2 kg |
| Cesium $^{137}Cs$ | $1 \times 10^{-2}$ $\mu$Ci | 16.1 kg |
| Tritium $^{3}H$ | 1 mCi | 6 kg |

This mercury mixed waste was treated identically to that of the uncontaminated mercury waste in Example 2, using sodium sulfide nonahydrate additive.

After processing, the molten mixtures were poured into one gallon paint cans and cooled. A total of five batches of waste forms, each consisting of three paint cans, were produced for disposal. A 10 g sample was taken from each of the five batches to form a single 50 g sample. A TCLP test was then conducted on the 50 g sample. This resulted in a TCLP concentration of 50 ppb, well below the EPA limit of 200 ppb.

EXAMPLE 9

This example demonstrates the process of the invention in treating mercury contaminated sand or soil. The waste was treated using the process as set forth in Example 2, using sodium sulfide as a stabilizing agent in an amount of approximately 2 wt % of the resulting waste form.

The subject waste was obtained from a remedial excavation of the Animal/Chemical Pits And Glass Holes conducted at Brookhaven National Laboratory in the Summer of 1997 in compliance with CERCLA and the New York State Regulations. Approximately 100 $ft^3$ containing greater than 260 ppm were segregated into two partially filled B-25 boxes. The physical composition of the soil was mostly sand and silt. The soil also contained a small percentage of gravel and approximately 5% debris (glass, metal and plastic), most of which was removed during subsequent repackaging operations. During excavation, the soil was screened to less than 1 inch. Significant homogenization of the soil and the B-25 boxes occurred during this segregation/screening process. Composite characterization data, summarized in Table 7, indicate average total mercury concentrations of 6,750 mg/kg and 18,000 mg/kg. Representative samples of each waste bin were TCLP tested yielding mercury concentrations of 3.56 mg/l and 0.26 mg/l, respectively, above current 0.2 mg/l limit, making them subject to EPA Land Disposable Restriction treatment standards. In addition to the varying levels of mercury, the two drums differed in isotopic mixture and concentrations. One contained relatively high concentrations of Am-241 and the other primarily Eu-152 and Ra-226.

TABLE 7

Characterization Data for BNL Mixed Waste Soils

| Parameter | B-25 Box 1 | Drum A-4 | B-25 Box 2 | Drum E-1 |
|---|---|---|---|---|
| Hg (total) | 6750 mg/kg | 5570 | 18,000 mg/kg | 4190 |
| Hg (TCLP) | 3.56 mg/l | 0.914 | 0.263 mg/l | 0.208 |
| Gross Alpha | 4560 pCi/g | * | 24.9 pCi/g | * |
| Gross Beta | 525 pCi/g | * | 35.9 pCi/g | * |
| $Am_{24}$ | 7140 pCi/g | * | — | * |
| $Pu^{238}$ | 72.6 pCi/g | * | — | * |
| $Pu^{239/240}$ | 19.7 pCi/g | * | — | * |
| $St^{90}$ | 2.15 pCi/g | * | — | * |

TABLE 7-continued

Characterization Data for BNL Mixed Waste Soils

| Parameter | B-25 Box 1 | Drum A-4 | B-25 Box 2 | Drum E-1 |
|---|---|---|---|---|
| $U^{233/234}$ | — | * | 7.06 pCi/g | * |
| $U^{238}$ | — | * | 5.87 pCi/g | * |
| $Eu^{152/154}$ | — | * | 28.7 pCi/g | * |
| $Ra^{236}$ | — | * | 35.5 pCi/g | * |

*Data not measured
—Below detection limit.

Each B-25 box of soil was subdivided into seven 55-gallon drums. To ensure testing of comparable wastes, the soil was evenly divided when repackaged by manually shoveling small scoops into each drum in turn. The drums were assigned a unique identification number (A1–A7 for drums from Box 1 which contains Am and E1–E7 for drums from Box 2 which contains Eu). Large pieces of debris were manually removed while repackaging. Prior to processing, the soil was re-sieved using a ⅜ inch screen, and a small quantity of stones were removed.

Although the soils tested in this Example contained relatively high concentrations of mercury (up to 5570 mg/kg), they contained far less mercury on a mass basis than the elemental mercury waste processed in Example 1. Thus, physical processing parameters, e.g., viscosity of the mix, rather than mercury leachability, represent the limited constraint on maximum waste loading. Using a commercial vertical cone blender, mixtures containing up to 70 wt % soil processed. However, when discharging the mixture at this waste loading, a layer of material tended to stick to the walls vessel and require manual scraping. When the waste loading was reduced to 60 wt % soil, the viscosity of the mixture was lower, and most of the mixture flowed easily out of the reaction vessel into the collection container. At this waste loading, the volume of treated waste was virtually the same as the untreated waste, i.e., no increase in volume resulted. This is due to the filling of void spaces in the soil by molten SPC.

Processing was accomplished using a pilot-scale vertical cone blender/dryer (Ross Mixers, Hauppauge, N.Y.) with a capacity of 1 ft³. A total of 12 batches of soil were processed to complete the pilot scale treatment of two 55-gallon drums of waste. Six batches were taken from drum A4 and six batches from E1. Approximately 20 g of treated material from each batch was prepared for composite TCLP analyses. The treatment for samples from drum A4 included the addition of sodium sulfide in an amount of 2 wt % of the final waste form. The treatment for samples from drum E1 did not include the addition of a stabilizing additive.

Composite data from the six batches from drum A4 and six batches from drum E1, are summarized in Table 8. The composite data for A4 indicate extremely low leachability for mercury, 0.005 mg/l. The composite data for E1, without the use of a stabilizing additive, resulted in a higher, but acceptable, leachability for mercury, 0.147 mg/l. This is compared with the untreated soil (0.914 mg/l), the current TCLP limit (0.2 mg/l), and the more stringent Universal Treatment Standard (UTS) (0.025 mg/l).

TABLE 8

Toxicity Characteristic Leaching Procedure (TCLP) Data for Mercury Contaminated Mixed Waste Soils

| Sample | Mercury Concentration, mg/l |
|---|---|
| Drum A-4 Soil, Untreated | 0.914 |
| Treated A-4 Soil with Stabilizing Additive ($Na_2S$) | 0.0005 |
| Drum E-1 Soil, Untreated | 0.208 |
| Treated E-1 Soil, without Stabilizing Additive | 0.147 |
| TCLP maximum concentration | 0.2 |
| UST maximum concentration | 0.025 |

The examples and description above demonstrate that the process of the invention is effective in stabilizing and solidifying mercury containing waste and mixed waste. The process reduces mercury solubility to enable compliance with EPA TCLP criteria, lowers mercury vapor pressure during processing and in the final product, eliminates dispersibility of the stabilized product, and reduces leachability of radioactive constituents. The process, therefore, provides a cost-effective solution for the treatment of mercury containing waste stored in such areas as the Department of Energy Complex, and elsewhere.

Thus, while there have been described what are presently believed to be the preferred embodiments of the invention, those skilled in the art will realize that changes and modifications may be made thereto without departing from the spirit of the invention, and it is intended to claim all such changes and modifications as fall within the scope of the invention.

We claim:

1. A process for the treatment of mercury containing waste in a single reaction vessel comprising the steps:
   (a) stabilizing said waste by combining the waste with sulfur polymer cement under an inert atmosphere at a temperature of about 20° C. to about 80° C. to form a resulting mixture;
   (b) encapsulating the resulting mixture by:
      (i) heating the mixture to a temperature of between 120° C.–150° C. to form a molten product, and
      (ii) casting said molten product as a monolithic final waste form.

2. A process as described in claim 1 wherein additional sulfur polymer cement is added in step (b).

3. A process as described in claim 2 wherein the additional sulfur polymer cement is added in an amount to form a waste loading of about 5 to about 90 wt % waste in the final waste form.

4. A process as described in claim 2 wherein mercury containing waste is essentially mercury and the additional sulfur polymer cement is added in an amount to form a waste loading of about 25 wt % to about 80 wt % waste in the final waste form.

5. A process as described in claim 4 wherein the additional sulfur polymer cement is added in an amount to form a waste loading of about 50 wt % to about 70 wt % in the final waste form.

6. A process as described in claim 2 wherein mercury containing waste is essentially mercury contaminated bulk material or debris and the additional sulfur polymer cement is added in an amount to form a waste loading of about 10 wt % to about 50 wt % waste in the final waste form.

7. A process as described in claim 6 wherein the additional sulfur polymer cement is added in an amount to form a waste loading of about 30 wt % to about 35 wt % in the final waste form.

8. A process as described in claim 1 wherein said mercury containing waste contains radionuclides.

9. A process as described in claim 1 wherein the inert atmosphere is argon or nitrogen.

10. A process as described in claim 1 wherein the sulfur polymer cement and mercury containing waste in step (a) are combined in a weight ratio of about 0.2–3.0.

11. A process as described in claim 10 wherein the sulfur polymer cement and mercury containing waste in step (a) are combined in a weight ratio of about 1.0.

12. A process as described in claim 1 wherein the sulfur polymer cement is reduced to a particle size less than about 3000 microns before being added in step (a).

13. A process as described in claim 1 further comprising adding a stabilizing additive where the stabilizing additive is added to the mercury containing waste and the sulfur polymer cement in step (a).

14. A process as described in claim 10 wherein the stabilizing additive is selected from the group consisting of sodium sulfide, triisobutyl phosphine sulfide, calcium hydroxide, sodium hydroxide, calcium oxide, magnesium oxide, and a combination thereof.

15. A process as described in claim 13 wherein the stabilizing additive is selected from the group consisting of sodium sulfide, triisobutyl phosphine sulfide and a combination thereof.

16. A process as described in claim 15 wherein the sodium sulfide is added in an amount from about 2.0 wt % to about 3.0 wt % of the final waste form.

17. A process as described in claim 13 wherein the stabilizing additive has been reduced to a particle size of less than about 3000 microns.

18. A process as described in claim 13 wherein the stabilizing additive is added in an amount of from about 0.5 wt % to about 20 wt % of the final waste form.

19. A process as described in claim 18 wherein the stabilizing additive is added in an amount from about 1.0 wt % to about 12 wt % of the final waste form.

20. A process as described in claim 19 wherein the stabilizing additive is added in an amount from about 2.0 wt % to about 5.0 wt % of the final waste form.

* * * * *